United States Patent [19]
Hammond, Jr. et al.

[11] Patent Number: 5,430,286
[45] Date of Patent: Jul. 4, 1995

[54] INTIMATE SOURCE AND DETECTOR AND APPARATUS EMPLOYING SAME

[75] Inventors: Charles M. Hammond, Jr.; William H. Havens; Andrew Longacre, Jr., all of Skaneateles, N.Y.

[73] Assignee: Welch Allyn, Inc., Skaneateles Falls, N.Y.

[21] Appl. No.: 202,669

[22] Filed: Feb. 25, 1994

Related U.S. Application Data

[63] Continuation of Ser. No. 822,484, Jan. 17, 1992, abandoned.

[51] Int. Cl.$^6$ .............................................. G06K 7/10
[52] U.S. Cl. .................................. 235/472; 235/462
[58] Field of Search ................ 235/472, 462; 250/216, 250/568

[56] References Cited

U.S. PATENT DOCUMENTS

| | | | |
|---|---|---|---|
| 3,744,026 | 7/1973 | Wolff | 235/472 X |
| 3,991,275 | 11/1976 | Bulthuis. | |
| 4,143,809 | 1/1979 | Uebbing et al.. | |
| 4,201,910 | 5/1980 | Copeland et al.. | |
| 4,281,908 | 8/1981 | Yamaguchi. | |
| 4,346,292 | 8/1982 | Routt, Jr.. | |
| 4,603,976 | 8/1986 | Fetzer et al. | 235/469 |
| 4,675,531 | 6/1987 | Clark et al.. | |
| 4,816,659 | 3/1989 | Bianco et al.. | |
| 4,866,258 | 9/1989 | Ueda et al.. | |

FOREIGN PATENT DOCUMENTS

| | | |
|---|---|---|
| 0061000 | 9/1982 | European Pat. Off.. |
| 0524349 | 1/1993 | European Pat. Off.. |
| 2479511 | 10/1981 | France. |

OTHER PUBLICATIONS

Optical System Design pp. 73, 74 "Two Thin Lenses, etc." and Afocal Systems, Jun. 1985.
Applied Optics, NASA Tech Briefs, May 1987, vol. 24, No. 12 pp. 33 and 1732.

*Primary Examiner*—Harold Pitts
*Attorney, Agent, or Firm*—Harris Beach & Wilcox

[57] ABSTRACT

There is provided a system of detecting mark-sense indicia wherein the images of a light source and the region of sensitivity of a light sensor are substantially coaxial, coplanar, and coextensive throughout the working depth of field. This system is insensitive to the laminate and the diffusion effects. A light source is aimed at a beam splitter that diverts a portion of the light beam through optics that focus the light on a reflective target containing a bar code symbol to be scanned. The reflected beam is returned through the optics and the beam splitter, and a portion of the reflected beam is conducted to a light sensor. In this manner, the light path from the detector to the optical sensor is split twice by the beam splitter. The optics are configured so that the light beams that define the field of illumination and the region of sensitivity and which pass between the optics and the target are congruent, having identical optical axes and angles of divergence.

14 Claims, 3 Drawing Sheets

INTIMATE SOURCE AND DETECTOR AND APPARATUS EMPLOYING SAME

This is a continuation of application Ser. No. 07/822,484 filed on Jan. 17, 1992, now abandoned.

BACKGROUND OF THE INVENTION

This invention relates to an assembly in a scanner or imager where the field of view of a light sensor and the field of illumination of a light source are coplanar and coextensive in any plane where the target is located.

In conventional mark-sense and imaging apparatus, the light source and light sensor are discrete and have optical paths which generally are not congruent in space. Such an arrangement provides a field of illumination that includes optical patterns of interest but which in general is larger than the light sensor's field of view (termed herein the sensor's region of sensitivity). The light sensor generates a signal that is specifically responsive to light from the region of sensitivity that is incident on the light sensor.

When the field of illumination is larger than the region of sensitivity, flood illumination is said to be present. In this circumstance the process of accurately interpreting the information content of the indicia being scanned is interfered with, as will now be explained.

In FIG. 3 there is illustrated a typical prior art device wherein LEDs 121,121 illuminate a field of illumination 124 on target 123. A region of sensitivity 122, being smaller than field of illumination 124, is entirely included within field of illumination 124. The region of sensitivity 122 is viewed by light sensor 127 through optics 125, and presents a signal to amplifier 129 in response to detected light.

Mark-sense detectors are typically employed in optical scanning devices, such as bar code scanners or readers, in which the output of the detector may be coupled to decoding circuitry. There are a number of known optical effects that can produce errors in the determination of transitions between bars and spaces in a bar code symbol that is situated on a substrate, including the diffusion and laminate effects.

The diffusion effect can be understood with reference to FIG. 4a and 4b. It results from light, shown representatively as beams 126, that is incident outside the region of sensitivity 122 of a light sensor. Beams 126 enter the substrate 138 on which a pattern is located, and are then scattered internally within the substrate into the region of sensitivity. A fraction of the scattered light is thus ultimately returned to the light sensor via region of sensitivity 122 where it contributes to the received signal level. In scanning applications such as bar code scanning there is another consequence of the diffusion effect. In this application the region of sensitivity travels across dark bars that are separated by fields of light spaces. These spaces are referred to herein as white spaces; however those skilled in the art will understand that areas of high reflectivity are denoted. As the region of sensitivity 122 approaches a dark bar 139, as shown in FIG. 4b, the bar 139 will absorb more light than does a white space of similar dimension. Since some light 128 is absorbed, less is available to scatter into the approaching region of sensitivity. Thus the diffusion effect differs quantitatively when a bar is near the region of sensitivity than when it is not. This can be appreciated with reference to FIG. 5 which shows an analog waveform 130 generated by a bar code scanner utilizing flood illumination which has scanned bar code symbol 132. It will be apparent that the signal minima 137 corresponding to the wide dark bars are quite sharp, while the maxima 135 corresponding to the intervening white spaces are rounded. Furthermore the peaks 136 corresponding to the narrow white spaces between the narrow dark bars 134 are reduced in amplitude relative to maxima 135 corresponding to wide white spaces 135 between the wide dark bars 137. This appearance is predicted by the above discussion of the diffusion effect. If the narrow dark bars could not be resolved due to the modulation transfer function of the reader's optical system, the patterns would have been symmetrical about the maxima and minima. While the diffusion effect has been explained in connection with a bar code scanner, it influences non-scanning readers of optical patterns as well. In summary, the diffusion effect tends to reduce the apparent white level in the vicinity of dark bars while not affecting the black level.

Another undesired effect of flood illumination in certain imaging applications, such as bar code scanning, is the laminate effect, also known as the overlay effect. Practical bar code symbols often possess protective overlaminates. The laminate effect is caused by the light that is scattered from outside the region of sensitivity being totally internally reflected at the overlaminate-to-air interface onto the region of sensitivity. Reference may be made to FIG. 6 where the laminate effect is depicted diagrammatically. During the lamination process an adhesive flows over the bar code symbol substrate 140, expelling the air between laminate 141 and bar code symbol 142. As a result, the laminate 141 and bar code symbol 142 are in intimate contact and are essentially index matched. When the laminated bar code substrate is illuminated, as with the diffusion effect, some of the incident light rays, such as rays 226a, 226b falling outside the region of sensitivity 122 are scattered from the top surface of layer 142 into overlaminate 141 and are incident on surface 227 at an angle 144 that can exceed the critical angle for total internal reflection. Such light rays 226a, 226b are totally internally reflected into the region of sensitivity 122. A portion of this light is then scattered back toward the overlaminate 141, penetrates it, and finally arrives at the light sensor, where it contributes to the received signal level. As in the case of the diffusion effect, as the region of sensitivity passes over the bar code symbol, some of the incident light will be absorbed by dark bars adjacent to the region of sensitivity, thereby reducing the white space signal level. The magnitude of the laminate effect is a function of laminate thickness, the dimensions of the bar code symbol, reflectance of the bars and spaces, nominal diffusion length in the substrate, and refractive index. While laminate effects are sometimes difficult to quantify, the range of this effect can be quite large. The laminate and diffusion effects are known to degrade the performance of bar code scanners, other types of mark-sense detectors, and image detecting apparatus generally. A laminated bar code symbol typically exhibits both the diffusion and the laminate effects.

It will be recognized that an analogous argument can be made for the case where a small source of illumination is used in conjunction with a large region of sensitivity, so called flood sensitivity. A number of methods have been employed in the prior art that tend to bring the beams of light from the light source and those directed to the light sensor from the target into alignment, establishing a common operational region. The images of the light source and the defined region of sensitivity are generally not congruent throughout a relatively large depth of field. For this reason, all these systems are sensitive to the degrading effects of the diffusion and laminate effects over all or most of their operational depth of field.

For example, in U.S. Pat. No. 4,346,292 to Routt, Jr. et al, there is shown an optical scanner in which source and reflected light beams are coaxially aligned at the target. In this device the region of sensitivity is substantially congruent with the field of illumination only in the immediate neighborhood of the focal plane, and it cannot achieve a larger depth of field without flood illuminating the target.

U.S. Pat. No. 4,675,531 to Clark et al shows a scanner that has coaxial incident and reflective beams, achieved by a multi-surfaced lens arrangement. The beams, while having the same optical axis, could not define a light source image that is congruent to a region of sensitivity except in the focal plane. This device would not be suitable for applications requiring a larger depth of focus where flood illumination is undesirable.

In U.S. Pat. No. 4,816,659 to Bianco et al an apparatus is shown in which a bar code symbol is illuminated by a lamp, and a reflected beam received by a photosensor. The illumination and detection optical axes are not coaxially aligned in the plane of the bar code symbol.

SUMMARY OF THE INVENTION

It is therefore a primary object of the present invention to provide a system of detecting mark-sense indicia that is insensitive to the laminate and the diffusion effects.

It is another object of the present invention to provide an improved system for detecting mark-sense indicia wherein the images of a light source and the region of sensitivity of a light sensor are substantially coaxial, coplanar, and coextensive throughout the working depth of field.

It is another object of the present invention to make an improved bar code scanner that is insensitive to the laminate and the diffusion effects.

These and other objects of the present invention are attained in an optical assembly that can be housed within a mark-sense detector, such as a bar code reader. A light source is aimed at a beam splitter that diverts a portion of the light beam through optics that focus the light on a reflective target containing a bar code symbol to be scanned. The reflected beam is returned through the optics and the beam splitter, and a portion of the reflected beam is conducted to a light sensor. In this manner, the light path from the detector to the optical sensor is split twice by the beam splitter. The optics are configured so that the light beams that define the field of illumination and the region of sensitivity and which pass between the optics and the target are congruent, having identical optical axes and angles of divergence. By appropriately specifying the axes of rotation of images that are projected onto the field of illumination and back projected from the region of sensitivity onto the light sensor, the field of illumination and region of sensitivity are brought into precise rotational alignment, such that the image of the light source is substantially coplanar and coextensive with the region of sensitivity in a working depth of field in which a target is located. The region of sensitivity is thus congruent with the field of illumination in any plane throughout the depth of field of the optics.

Field stops may be provided for the light source and the light sensor in order to better define the dimensions of the field of view and field of illumination. When this is done an image of the light source field stop is projected precisely onto the region of sensitivity, and the back-projection of the region of sensitivity is focused on and coextensive with the field stop of the light sensor.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
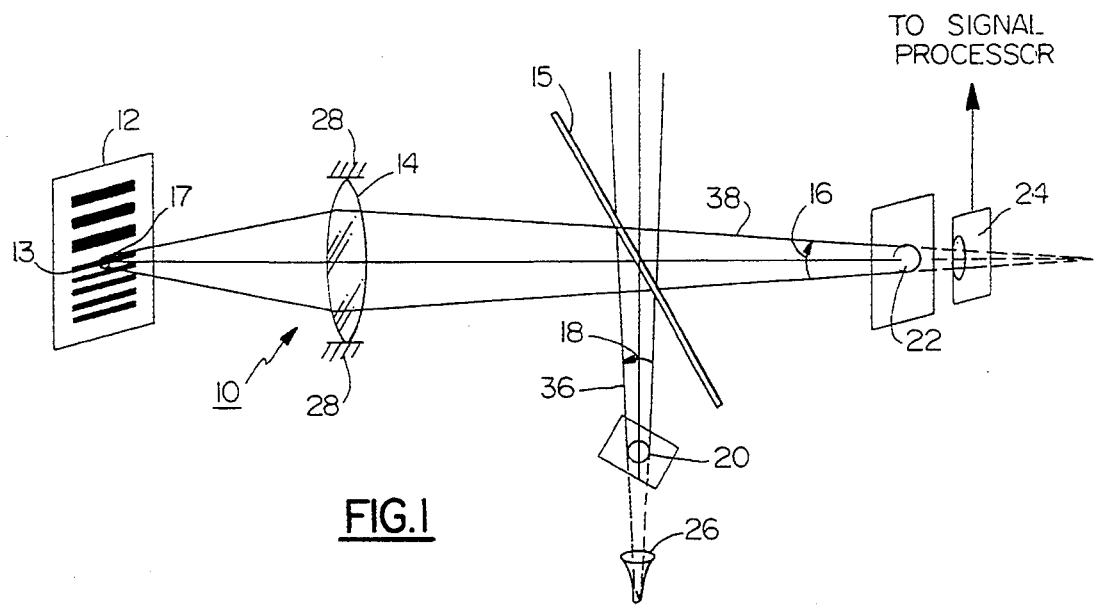
FIG. 1 is a schematic illustration of an assembly in accordance of the present invention shown in a bar code reading application.

Turning now to FIG. 1, there is shown generally at 10 an illustration of an optical assembly in accordance with the present invention. While not illustrated in order to preserve clarity, assembly 10 is generally contained within the housing of a bar code scanner. The housing has a port to permit the passage of light therethrough in a desired direction. A function of the housing with respect to assembly 10 is the exclusion of unwanted light from light sensor 24. The invention may be practiced in other applications with any suitable means for the exclusion of unwanted light, such as a shield, or a partially enclosing canopy. Light source 26 emits a beam of light 36 that in the preferred embodiment has a sectional area and configuration that are defined by light source field stop 20. Light source 26 is preferably an LED or a laser, but could be an incandescent lamp, arc lamp, or any suitable source of light. If the image of light source field stop 20 as projected onto target 12 is noncircular, then the light source field stop 20 is suitably aligned about a rotational axis so that the field of illumination will be rotationally aligned with minimal bar code symbol element 13. Alternatively the optics can be configured to achieve rotational alignment. Light source field stop 20 is preferably circular; however other field stop designs may be employed.

Light beam 36 eventually strikes beam splitter 15, a conventional partially silvered mirror type splitter that is disposed at a 45 degree angle to light beam 36. Other angles could be used to accommodate specific applications. Normally a 50% beam splitter is used, but this may be varied if desired. A proportion of beam 36 continues beyond beam splitter 15 and is lost; the remainder of the beam is reflected by beam splitter 15 and is directed to lens 14 at an angle of divergence 18.

Figure 2:
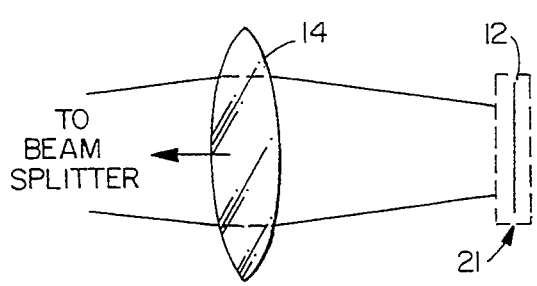
FIG. 2 is a side view of the apparatus of FIG. 1 shown schematically.
Figure 4A:
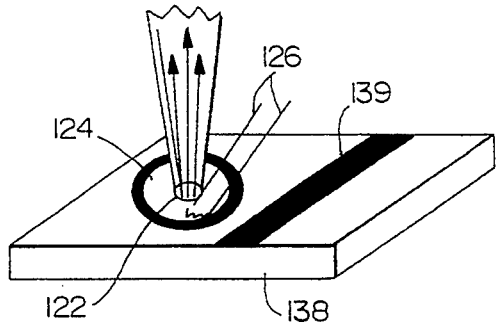
FIGS. 4a, 4b, and 5 are diagrams explaining the diffusion effect.
Figure 4B:
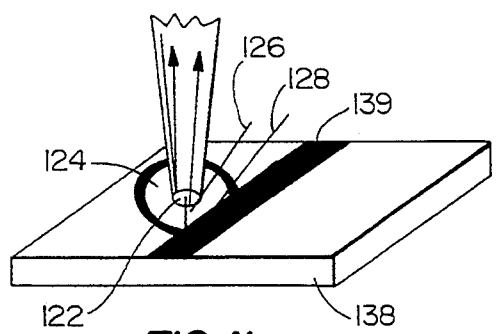
Figure 3:
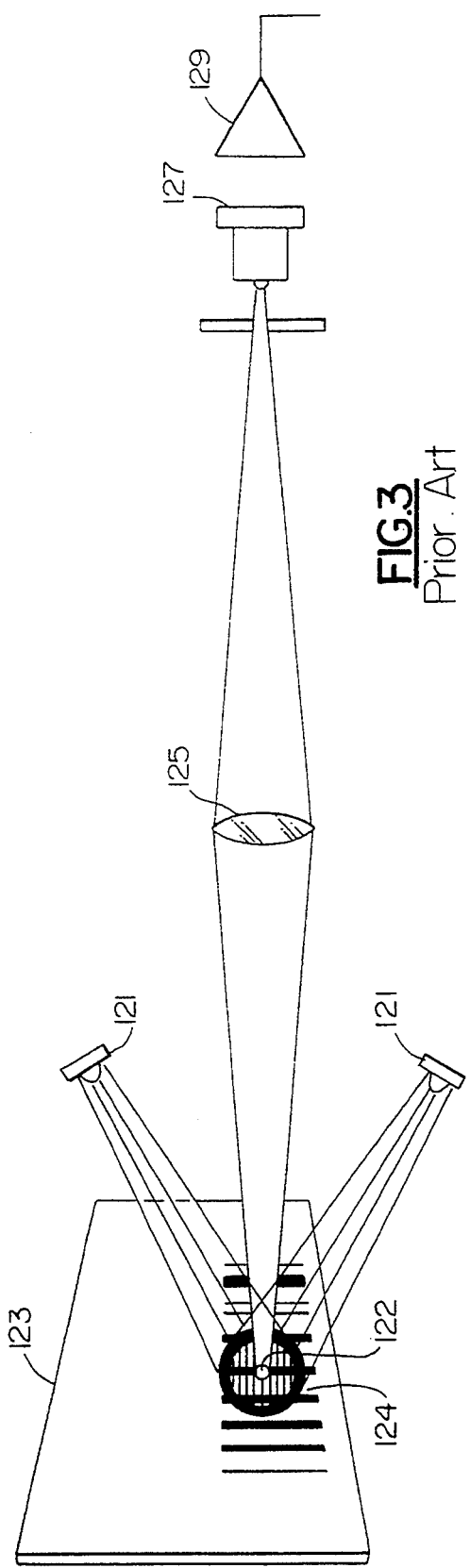
FIG. 3 is a schematic view of an optical reader in accordance with the prior art.
Figure 5:
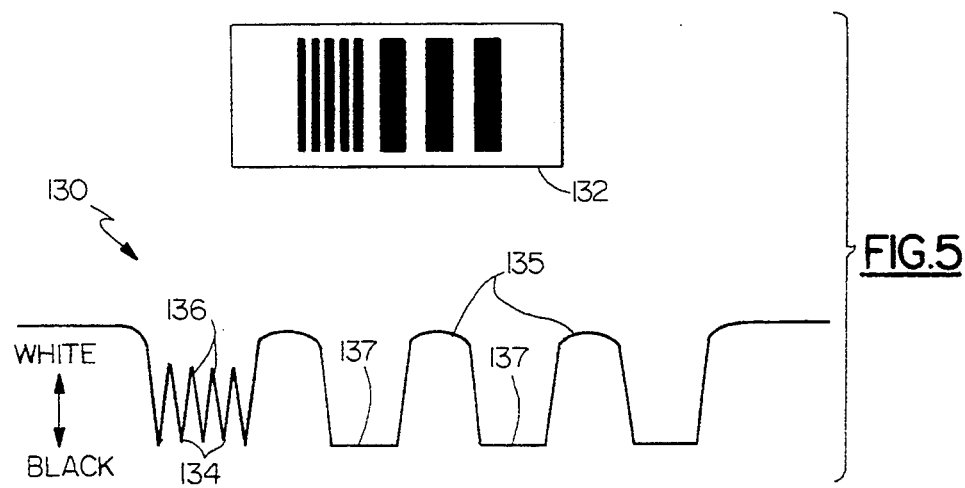
Figure 6:
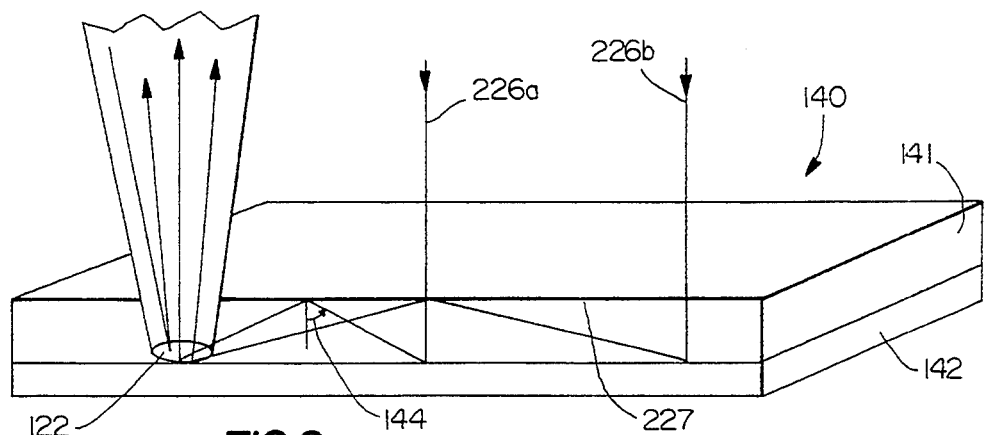
FIG. 6 is a diagram explaining the laminate effect.

Lens 14 is any suitable lens or system of lenses that focuses an image of light source field stop 20 on bar code symbol 12, also shown in FIG. 2. Aperture 28 is provided to control lens aberrations. Region 21 defines the useful working depth of field of the instrument, and it may be varied by suitable design of the aperture-lens combination, as is well known in the art. When the light beam passes through lens 14, and strikes a region 17 of the bar code symbol, the width dimension of the optical image of the light source field stop 20 formed thereon by lens 14 is of the order of the lateral dimension of the bar code symbol minimum element width 13.

Reflected light from a region 17 is captured by lens 14 and returned to beam splitter 15. A portion of the light passes through the beam splitter, and an image of region 17 of the bar code symbol is projected by lens 14 onto light sensor field stop 22. Light energy reflected from region 17 is thus eventually received by light sensor 24, which generates a signal in response thereto. The signal produced by sensor 24 is coupled to conventional signal processing circuitry. The light beam 38 extending from light sensor 24 to beam splitter 15 as defined by light sensor field stop 22 has an angle of divergence 16 that is equal to angle 18.

Field stops 20 and 22 should be equal in size and configuration. They are positioned equidistant from the beam splitter, close to the light source and light sensor respectively, and are oriented such that their optical images in region 21 are coaxial, coplanar and coextensive. The cones of light beams defined by the field stops will thus be congruent in three dimensions between the beam splitter 15 and the optical images of field stops 20 and 22 in region 21.

The light sensor 24 is conventional and can be a photodiode, avalanche photodiode, photomultiplier, phototransistor, or a photo-FET.

It is possible to operate the apparatus without field stops 20 and 22, and directly focus the images of optically sensitive areas of light sensor 24 and of light source 26 in region 21. However the field stops are useful in avoiding interference from filament images and the structural detail of the light sensor. The field stops 20 and 22 may be implemented as an integral part of the light source 26 and the light sensor 24 respectively. The light sensor, of course, is responsive to defocused light that has passed through light sensor field stop 22.

It will be appreciated that the positions of light source 26 and light sensor 24 can be interchanged without affecting the function of the apparatus.

Figure 7:
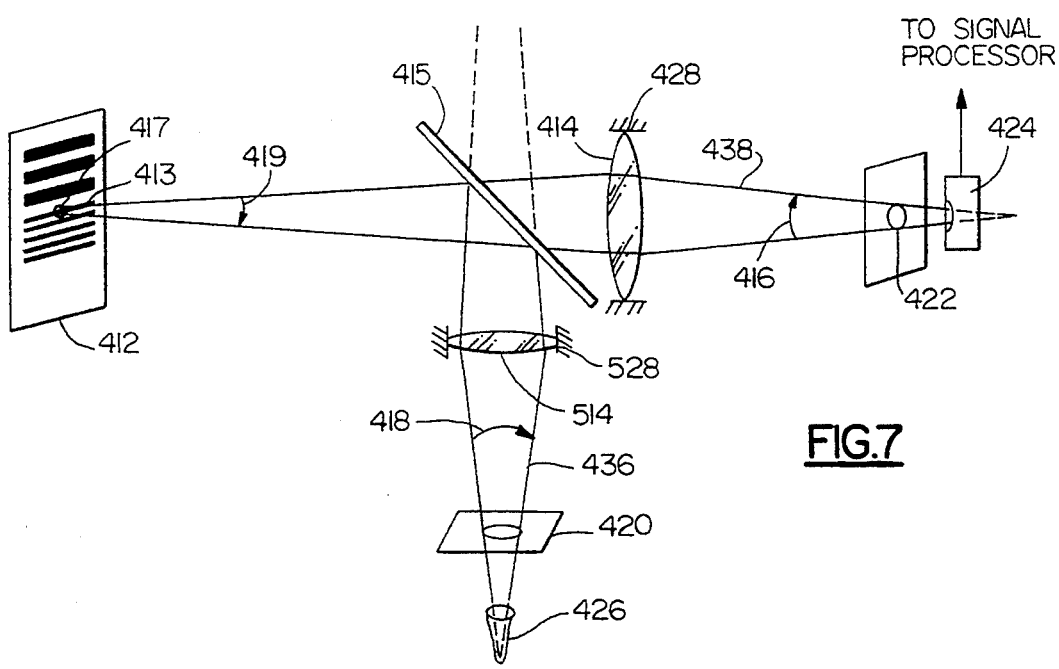
FIG. 7 is a schematic illustration of an alternate embodiment of the invention.

Referring now to FIG. 7, there is shown an alternative embodiment of the invention, in which reference numerals of similar elements in respect of FIG. 1 are advanced by 400.

Light source 426 emits a beam of light 436, preferably through a light source field stop 420 that defines its sectional area and configuration.

Light beam 436 is now directed through a first lens 514 at an angle of divergence 418. Lens aberrations are reduced by aperture 528, associated with the lens 514. The light beam, having passed through lens 514, eventually strikes beam splitter 415, which is disposed at a 45 degree angle to the optical axis of incident light beam 436. Other angles could be used to accommodate specific applications. Normally a 50% beam splitter is used, but this may be varied if desired. A portion of beam 436 continues beyond beam splitter 415 and is lost; the remainder of the beam is reflected by beam splitter 415 and is directed to target 412, converging at an angle 419.

When the light beam passing through lens 514 strikes a region 417 of the bar code symbol, the width dimension of the optical image of the light source field stop 420 formed thereon by lens 514 is of the order of the lateral dimension of the bar code symbol minimum element width 413.

Reflected light from the region 417 of the bar code symbol is incident on beam splitter 415. A portion of the light passes through the beam splitter, through a second lens 414, onto light sensor field stop 422, and is eventually received by light sensor 424, which generates a signal in response thereto. This signal is conducted to signal processing circuitry. Aperture 428, associated with lens 414, reduces lens aberrations.

In this embodiment lens-aperture combinations 414,428 and 514, 528 are designed so that the images of field stops 420 and 422 are substantially coaxial, coplanar, and coextensive in a working depth of field in which bar code symbol 412 is located. The lenses are not necessarily identical, but may be designed to accommodate geometrical constraints in the housing of a scanner that require the light paths between light source 426 and beam splitter 415 to be of different length from the path between beam splitter 415 and light sensor 424.

Field stops 420 and 422 should be geometrically similar in shape, but need not be equal in size. They are positioned close to the light source and light sensor respectively. The cones of light beams defined by the field stops will be substantially congruent in three dimensions in the working depth of the instrument.

Field stops 422 and 420 may be integrated into the light sensor 424 and the light source 426. It will be appreciated that the positions of light source 426 and light sensor 424 can be interchanged without affecting the function of the apparatus. Folded light paths may also be employed without departing from the spirit of the invention, so long as the desired congruence of the light beams in the working region as discussed above is maintained.

While this invention has been explained with reference to the structure disclosed herein, it is not confined to the details set forth and this application is intended to cover any modifications and changes as may come within the scope of the following claims:

What is claimed is:

1. An optical assembly for use in detecting indicia, comprising:

a light source means for emitting a first beam of light that is incident on a field of illumination of a target, said target being located in a working depth of field, said working depth of field substantially exceeding a single plane;

a light sensor means for producing a signal in response to light carried in said first beam to said target and returning from a region of sensitivity thereon, said returning light being carried in a second beam of light that extends from said target to said light sensor means;

optical means disposed in said first beam of light and in said second beam of light for forming an image of said light source means on said target, said optical means forming a back-projection of said region of sensitivity on said light sensor means, said back-projection being transmitted in said second beam, said first beam and said second beam following a common path between said optical means and said target;

means for configuring said light source means to a sectional area and shape that are identical to a sectional area and shape of said light sensor means at said target; and means for dimensioning at least one of said first beam and said second beam such that said first beam and said second beam are precisely superimposed between said target and said optical means;

whereby said field of illumination precisely coincides with said region of sensitivity.

2. The apparatus according to claim 1, wherein said means for configuring comprises:
   a first field stop proximate said light source means; and
   a second field stop proximate said light sensor means.

3. The apparatus according to claim 1, wherein said optical means comprises:
   beam splitter means for directing a portion of said returning light to said light sensor means, and for directing a portion of light emitted from said light source means to said target; and
   a lens.

4. The assembly of claim 3, wherein said lens comprises:
   a first lens, disposed between said beam splitter means and said light source means; and
   a second lens, disposed between said beam splitter means and said light sensor means.

5. The assembly of claim 3, wherein said lens means comprises a single lens, disposed between said beam splitter means and said target.

6. The assembly of claim 1, wherein said first field stop means is integral with said light source means.

7. The assembly of claim 1, wherein said second field stop means is integral with said light sensor means.

8. The assembly of claim 1, wherein said first and second field stop means comprise circular field stops.

9. The assembly of claim 1, wherein said first and second field stop means comprise elliptical field stops.

10. The assembly of claim 1, wherein said first and second field stop means comprise polygonal field stops.

11. The assembly of claim 1, wherein said first and second field stop means comprise rectangular field stops.

12. The apparatus according to claim 1, wherein said means for dimensioning comprises a lens aperture.

13. The assembly of claim 1, wherein said light sensor means is selected from the group of photodiode, avalanche photodiode, photomultiplier, phototransistor, and photo-FET.

14. The assembly of claim 1, wherein said light source means is selected from the group of LED, laser, incandescent lamp, and arc lamp.

* * * * *